United States Patent
Sumi et al.

[15] 3,699,803
[45] Oct. 24, 1972

[54] SEMICONDUCTOR ELEMENT FOR DETECTING GASES AND METER FOR MEASURING COMPONENT CONCENTRATION OF A GAS MIXTURE

[72] Inventors: Kiyoshi Sumi, Kyoto; Naomasa Sunano, Ayabe, both of Japan

[73] Assignee: Shiney Co., Kobe, Japan

[22] Filed: July 20, 1971

[21] Appl. No.: 164,331

[30] Foreign Application Priority Data

July 21, 1970 Japan....................45/64064

[52] U.S. Cl..................73/27 R, 324/71 SN, 338/34
[51] Int. Cl............................................G01n 27/12
[58] Field of Search ...73/23, 27; 324/71 SN; 338/34, 338/35; 23/254, 255

[56] References Cited

UNITED STATES PATENTS

| | | | |
|---|---|---|---|
| 3,039,053 | 6/1962 | Jacobson | 324/71 |
| 3,507,145 | 4/1970 | Loh | 73/23 |

FOREIGN PATENTS OR APPLICATIONS

| | | | |
|---|---|---|---|
| 2,005,497 | 11/1970 | Germany | 73/23 |

OTHER PUBLICATIONS

Seiyama et al., " Study on a Detecter for Gaseous Components Using Semi–conductive Thin Films," Analytical Chemistry, Vol. 38, No. 8, July, 1966, pp. 1069– 1073.

Primary Examiner— Richard C. Queisser
Assistant Examiner— C. E. Snee, III
Attorney—E. F. Wenderoth et al.

[57] ABSTRACT

A gas vapor detecting element comprises an alumina ceramic cylinder with a coil-like heater extending through the interior thereof, and a gas detecting semiconductor and a temperature compensating semiconductor made of the same oxide semiconductor material and fixedly provided by sintering around the outer peripheral surface of the cylinder in adjacent relationship to each other. The opposite open ends of the ceramic cylinder are sealed with a glass material and the temperature compensating semiconductor is also covered and enclosed with the glass material. Contact of the detecting element with an atmosphere of insanitary gas vapor produces a variation in the ratio of resistance value between the gas detecting semiconductor and the enclosed temperature compensating semiconductor, whereby the presence and concentration of the insanitary gas vapor is detected. The gas vapor can be detected accurately by keeping the ratio of resistance value between the gas detecting semiconductor and the temperature compensating semiconductor constant in the atmosphere which may have a varying temperature. A meter for measuring the concentration of insanitary gas vapor in accordance with this invention principally comprises the above-mentioned detecting element, with the gas detecting semiconductor and the temperature compensating semiconductor thereof connected to auxiliary resistors respectively to provide a bridge circuit. Thus, the variation in the ratio of resistance value between both of the semiconductors is taken out as a potential difference across the bridge circuit which is directly indicated in terms of the concentration of a gas vapor to be measured on a potentiometer provided with a concentration scale.

10 Claims, 12 Drawing Figures

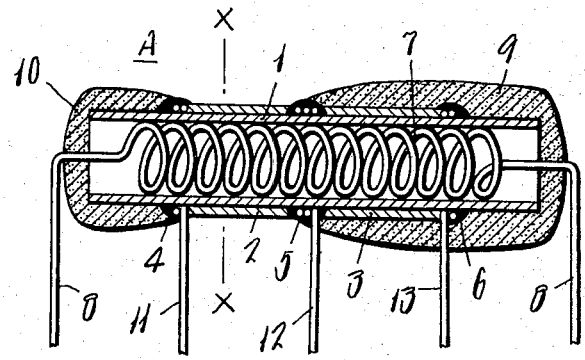
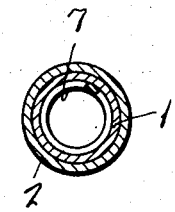
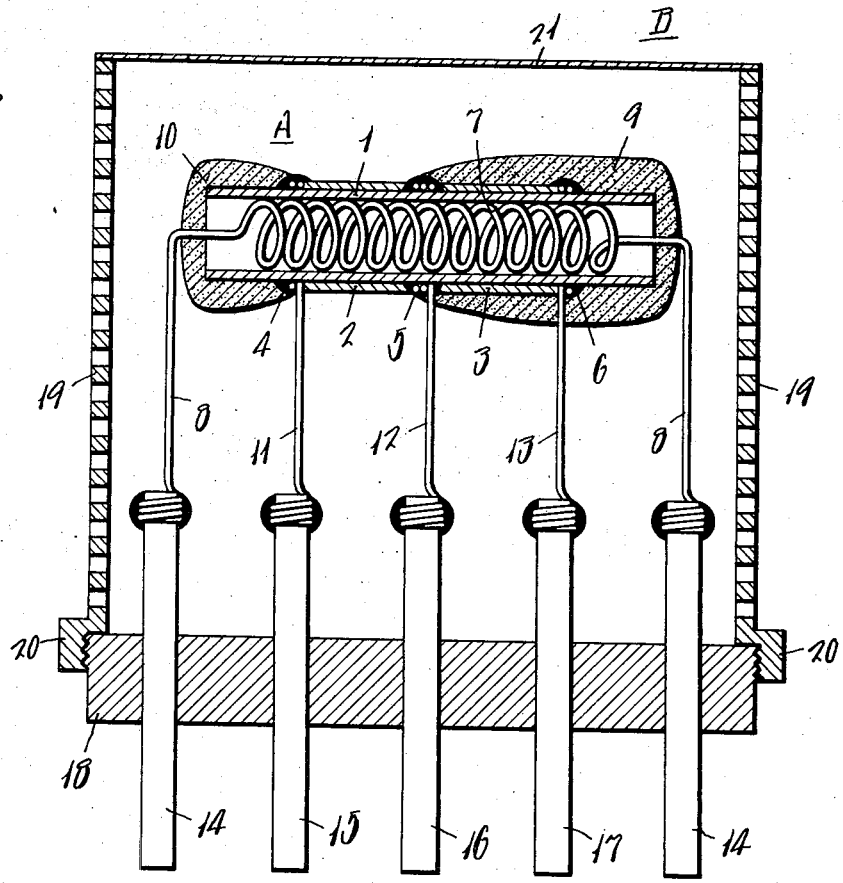

SEMICONDUCTOR ELEMENT FOR DETECTING GASES AND METER FOR MEASURING COMPONENT CONCENTRATION OF A GAS MIXTURE

BACKGROUND OF THE INVENTION

The present invention relates to an element for detecting insanitary gas vapor and a meter for measuring the concentration of insanitary gas vapor incorporating therein such detecting element.

Various devices have heretofore been used for detecting gas vapors and measuring the concentration of gas vapors, and versatile types of gas vapor detecting or sensing elements employing a metal oxide semiconductor are known for such purpose. In the case where a metal oxide semiconductor is used as a gas detecting element, the concentration of a gas vapor to be measured is detected based on the variation in the resistance value of the semiconductor which is produced when the semiconductor comes into contact with the gas vapor since the variation is considered to be directly proportional to the concentration of the gas vapor.

Thus it is known that the contact of a metal oxide semiconductor with an insanitary gas vapor atmosphere results in a variation in the resistance value of the semiconductor and that the level of concentration of the insanitary gas vapor exerts an influence on the resultant variation in the resistance value of the semiconductor. On the other hand, however, there is a need to consider the temperature characteristics and physical weakness generally attending the metal oxide semiconductor: the resistance value of the metal oxide semiconductor, which is subject to the effect of an insanitary gas vapor atmosphere as already described, is also influenced by the temperature and physical impact of the atmosphere. Accordingly, in employing certain types of metal oxide semiconductors as a detecting element for a gas vapor, it is strictly required to provide temperature compensation and to use them in the form of a physically strong sintered product.

SUMMARY OF THE INVENTION

These requirements are fulfilled by the present invention providing an element for detecting insanitary gas vapor which has a temperature compensating function and which is compact in construction, accurate in performance, physically strong and free of influence of moisture.

The element for detecting insanitary gas vapor in accordance with this invention comprises a gas detecting semiconductor exposed to the atmosphere and made of a sintered oxide product and a temperature compensating semiconductor hermetically sealed and shielded from the atmosphere and made of the same sintered oxide product as the gas detecting semiconductor, both the semiconductors being fixedly provided around the outer peripheral surface of a cylinder and disposed adjacent each other, the cylinder being adapted to be heated to a constant temperature. Thus, in relation to the changes in environmental conditions other than the presence of an insanitary gas vapor, the ratio of the resistance value between the gas detecting semiconductor and temperature compensating semiconductor is maintained at a constant level all the time, whereas a gas vapor to be detected, when sensed, produces a variation in the resistance value of the gas detecting semiconductor alone and thereby disturbs the balance between the gas detecting semiconductor and the temperature compensating semiconductor at the above-mentioned ratio of the resistance value, the resulting change thus serving to indicate the presence of the insanitary gas vapor to be detected as well as the concentration thereof.

BRIEF DESCRIPTION OF THE DRAWING

FIG. 1 is a view in vertical section showing an element for detecting insanitary gas vapor in accordance with this invention;

FIG. 2 is a view in section taken along the line X — X in FIG. 1;

FIG. 3 is a view in vertical section showing an assembly for detecting insanitary gas vapor;

DESCRIPTION OF THE PREFERRED EMBODIMENTS

Figure 4:
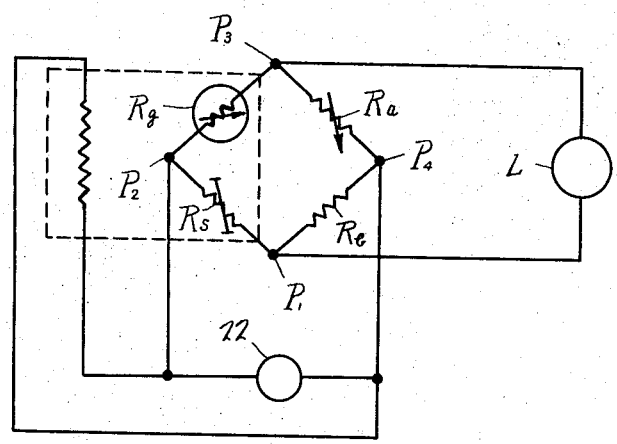
FIG. 4 is a diagram showing an equivalent circuit for a meter for measuring the concentration of an insanitary gas vapor.

With reference to the drawing, the present invention will be described in greater detail. As shown in FIGS. 1 and 2, a gas detecting element A comprises a cylinder 1 made of an alumina ceramic material and, a gas detecting semiconductor 2 and a temperature compensating semiconductor 3 fixedly provided around the outer peripheral surface of the cylinder 1 and disposed adjacent each other with a very small space interposed therebetween. The semi-conductors 2 and 3 are formed by applying a metal oxide material to the peripheral surface of the cylinder 1 and drying and sintering the material in a sintering furnace. The metal oxide material comprises, for example, vanadium pentoxide $V_2O_5$, zinc oxide ZnO and silver oxide $Ag_2O$ in the ratio of the 10 – 5 : 95 – 87 : 0.5 – 3, or vanadium pentoxide $V_2O_5$, tin oxide $SnO_2$ and silver oxide $Ag_2O$ in the ratio of 12 – 7 : 93 – 87 : 0.5 – 3, or the like as will be described later. A common lead member 12 for short-circuiting the gas detecting and temperature compensating semiconductors 2, 3 and lead members 11, 13 at the opposed ends of both the semiconductors 2, 3 are fixedly connected to the outer periphery of the cylinder 1 by sintered members 4, 5, 6 of gold, vanadium gold or the like, the lead members 12, 11, 13 further being connected to lead wires wound thereon respectively. Extending through the cylinder 1 is a heater 7 in the form of a winding, with its lead members 8, 8 extending outwardly thereof. The openings of the cylinder 1 at its opposite ends and the outer periphery of the temperature compensating semiconductor 3 are completely enclosed by applying molten glass as at 9 and 10.

The gas detecting element A having the foregoing construction will further be described with respect to the material of the gas detecting semiconductor 2 and the temperature compensating semiconductor 3. The gas detecting semiconductor 2 and the temperature compensating semiconductor 3 should be produced by sintering from the same semiconductor substance having identical properties and identical quality. In the case where several kinds of materials are used in mixture, both semiconductors should be the same in composition proportion. When the sintered semiconductor comes into contact with the aforementioned gas, a carrier is produced within the semiconductor depending upon the concentration of the gas in contact therewith such that escape of one oxygen atom generates two electrons.

The composition of material of the semiconductors may comprise, for example, $V_2O_5$, ZnO and $Ag_2O$ in the ratio of 10 – 5 : 87 – 95 : 0.5 – 3; $V_2O_5$, $SnO_2$ and $Ag_2O$ in the ratio of 12 – 7 : 85 – 97 : 0.5 – 3; ZnO and $SnO_2$ in the ratio of 90 – 10 : 10 – 90; ZnO and CuO in the ratio of 85 – 90 : 15 – 10; $SnO_2$ and CuO in the ratio of 90 – 95 : 10 – 5; or the like, all the ratios being by weight. The composition of the material for the semiconductors may be suitably selected depending upon the type of the gas or the gas vapor to be detected. More specifically, if the gas to be detected is organic gas such as acetone, butyl alcohol, toluol, styrene monomer, tetrabromoethane, ethyl alcohol, methyl ethyl ketone, ethyl acetate, isopropyl slcohol, methylchroloform or the like, the starting composition for the gas detecting semiconductor 2 and the temperature compensating semiconductor 3 may comprise $V_2O_5$ and ZnO in the weight ratio of 10 – 5 : 90 – 95. The addition of 1 percent of $Ag_2O$ to the composition achieves a good result. On the other hand, this composition does not react with benzene and xylene. For the detection of propane gas, it is suitable to employ a composition comprising $V_2O_5$ and $SnO_2$ in the weight ratio of 7 : 93 in combination with several percent of $Ag_2O$. If the gas to be detected is sulfurous acid gas $SO_2$, carbon monoxide CO or the like, the ingredients and the composition proportion may be determined suitably in accordance with the kind of the gas.

The gas detecting element A of this invention is kept at a constant elevated temperature with the heat generated by the heater 7, the suitable temperature being in the range of about 300° to 450°C. In practice, the desired temperature may be determined in accordance with the gas vapor to be detected and the material of the semiconductor. For example, if the gas to be detected is an organic solvent gas vapor and the semiconductor is made of $V_2O_5$, ZnO and $Ag_2O$, the temperature may suitably be about 400°C.

The characteristics of the gas detecting element A, as it is kept at a given temperature, will now be described in relation with changes in its environment such, for example, as the variation in the voltage on the heater or variation in the temperature of the atmosphere in which it is placed for detecting operation. For example, the variation in the voltage of the power source for the heater varies the heat generation of the heater in proportion thereto, which in turn exerts an influence on the temperature of the gas detecting element A, resulting in a variation in the resistance values of the gas detecting semiconductor 2 and the temperature compensating semiconductor 3.

As already described, however, it is to be noted that with the gas detecting element A of the present invention, a gas vapor is detected not from the variation in the resistance of the gas detecting semiconductor 2 but on the basis of the ratio of resistance value between the gas detecting semiconductor 2 and the temperature compensating semiconductor 3, so that even when the temperature of the gas detecting element A per se varies due to the variation in the heat generation of the heater as well as in the temperature of the atmosphere to be monitored, the variation in temperature influences both the gas detecting semiconductor 2 and the temperature compensating semiconductor 3 equally, without affecting the ratio of the resistance value between the semiconductors 2 and 3. This is what is referred to as the temperature compensating function of the gas detecting element in accordance with this invention.

Figure 8:
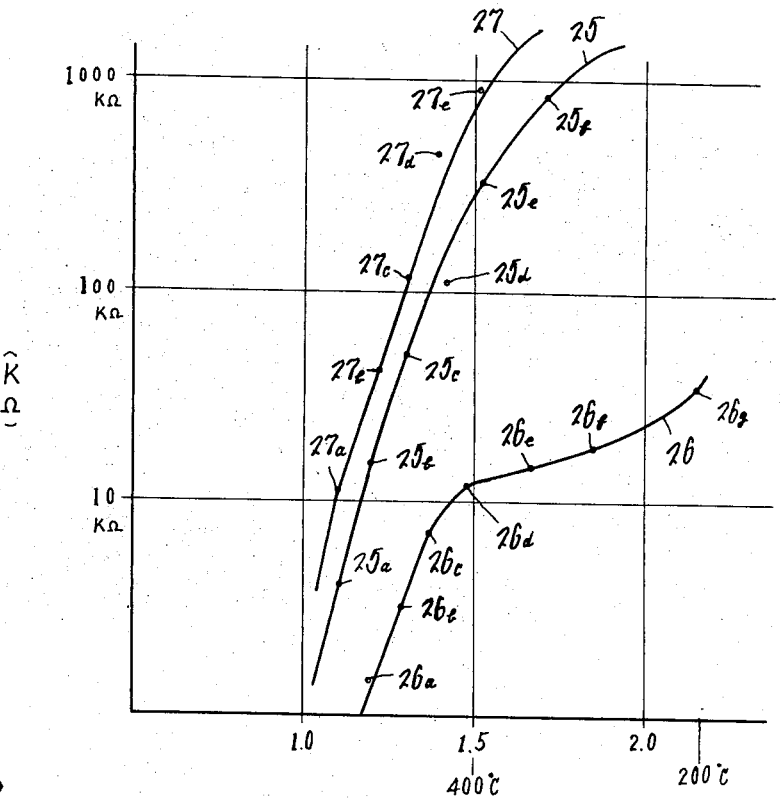
FIG. 8 is a graph showing the temperature characteristics of the element for detecting insanitary gas vapor in accordance with this invention.

To observe the temperature compensating function of the gas detecting element A of this invention, various semiconductors prepared from different compositions were experimented. The resultant data about the variation in the resistance value are shown in the graph of FIG. 8. In this graph, the electric resistance value in logarithm is plotted as ordinate vs. the temperature of the gas detecting element A as abscissa, the gas to be detected being a normal atmosphere.

Referring to FIG. 8, a curve 25 represents a semiconductor made of a composition consisting of ZnO, $V_2O_5$ and $Ag_2O$ in the weight ratio of 92 : 7.5 : 0.5; a curve 26, a semiconductor made of a composition consisting of $SnO_2$ and $V_2O_5$ in the weight ratio of 90 : 10; and a curve 27, a semiconductor made of a composition consisting of ZnO and $SnO_2$ in the weight ratio of 90 : 10. The gas detecting semiconductor 2 and temperature compensating semiconductor 3 constituting the gas detecting element A are made of the same semiconductor.

It is seen from FIG. 8 that with the semiconductors consisting of ZnO, $V_2O_5$ and $Ag_2O$, the resistance values $25a$, $25b$, ... $25f$ as determined in recording the variation in resistance value of the temperature compensating semiconductor 3, are positioned on the curve 25 representing the variation in the resistance value of the gas detecting semiconductor 2. Likewise, with respect to the semiconductors made of $SnO_2$ and $V_2O_5$, the resistance values $26a$, $26b$ ... $26g$ obtained are found to be located on the curve 26, and also with respect to the data about the semiconductors consisting of ZnO and $SnO_2$, it is ascertained that the values $27a$, $27b$, ... $27f$ are located on the curve 27.

The foregoing results clearly show that the variation in temperature further varies both the resistance value $R_a$ of the gas detecting semiconductor 2 and the resistance value $R_s$ of the temperature compensating semiconductor 3 but does not affect the ratio $R_a/R_s$ between the resistance values of the gas detecting semiconductor 2 and temperature compensating semiconductor 3.

Figure 9:
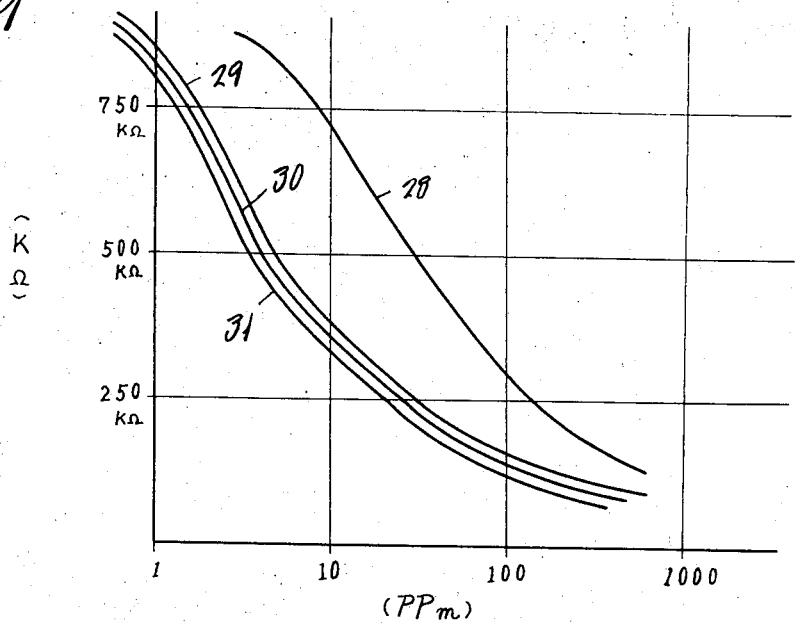
FIGS. 9 to 11 are graphs showing characteristics of the detecting element of this invention in relation to various types of gases and varying temperatures.

The graph of FIG. 9 shows the results obtained by measuring the variation in the resistance value $R_g$ of the gas detecting semiconductor 2 of the present detecting element A caused by the variation in the concentration of a gas vapor of a given type. In this graph the resistance value $R_g$ of the gas detecting semiconductor 2 is plotted as ordinate and the concentration of the gas as abscissa. The composition of the semiconductor used consisted of ZnO, $V_2O_5$ and $Ag_2O$ in the weight ratio of 92 : 7.5 : 0.5 and the gas detecting element A was kept at a temperature of 400°C. The curves each represent the results obtained with respect to each gas used: a curve 28 for acetone, a curve 29 for methanol a curve 30 for methylchloroform, and a curve 31 for styrene monomer.

Thus it is seen that whereas the gas detecting semiconductor 2 of the gas detecting element A of this invention undergoes an apparent variation in accordance with the concentration of the gas to be detected, the temperature compensating semiconductor 3 which is hermetically sealed by the sealing member 9 and is therefore free of contact with the gas is not affected by the difference in the kind of gas and the variation in the concentration thereof.

Figure 10:
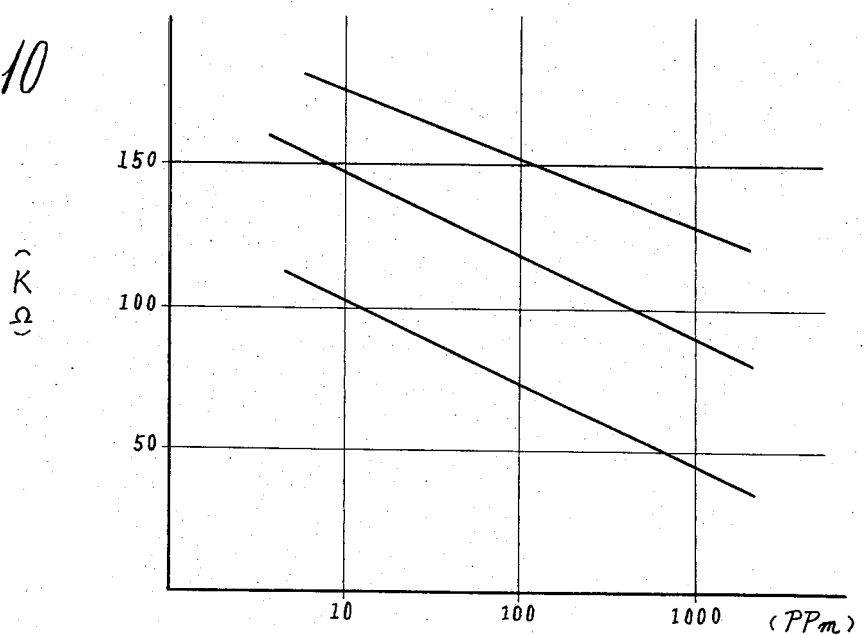
Figure 11:
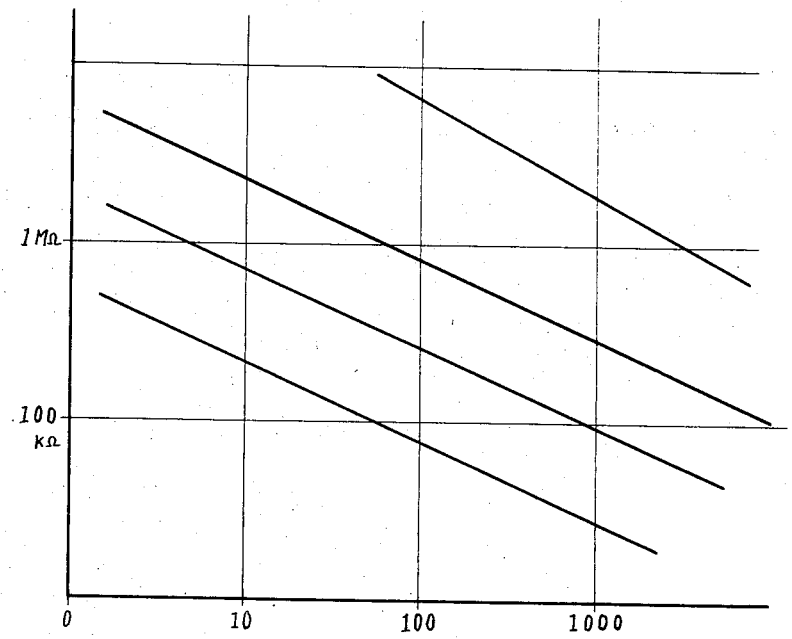

The graphs of FIGS. 10 and 11 show the relationship between the variation in temperature of the present gas detecting element A per se and the resistance value $R_g$ of the gas detecting semiconductor 2 as determined by actual measurement.

In the graph of FIG. 10, the resistance value $R_g$ is plotted as ordinate vs. the concentration of gas as abscissa. Acetone was used and the semiconductor used for the experiment was one consisting of $V_2O_5$, $SnO_2$ and $Ag_2O$ in the weight ratio of 7 : 92.5 : 0.5. In this graph the resistance values of the semiconductor 2 as measured at 250°C are represented by a curve 32, those at 300° by a curve 33, and those at 400°C by a curve 34.

In the graph of FIG. 11, the resistance value $R_g$ is plotted as ordinate and the concentration of the gas as abscissa, the gas used being acetone. The composition of the semiconductor used for the measurement consisted of $V_2O_5$, $SnO_2$ and $Ag_2O$ in the weight ratio of 7.5 : 92.5 : 0.5. In this graph a curve 35 represents the results of measurement at 350°C, a curve 36 those at 400°C and a curve 37 those at 450°C. Further a curve 38 indicates the results of measurement conducted using a semiconductor consisting of ZnO and $SnO_2$ in the weight ratio of 90 : 10, the temperature of the semiconductor being 400°C. The gas used for measurement was acetone the same as above.

The results in the graphs of FIGS. 10 and 11 have revealed that the gradient of the resistance value $R_g$ of the gas detecting semiconductor 2, namely the sensitivity gradient thereof relative to the gas vapor to be detected is constant in relation to temperature.

It is required that the gas detecting element A of this invention be maintained at a constant temperature when placed in the atmosphere of the gas vapor to be detected. Accordingly, the detecting element may be housed in a container to be described below to form an assembly B for detecting insanitary gas vapor.

As shown in FIG. 3, the assembly B includes an insulating base 18 provided with opposite terminals 14, 14 fixedly extending through the base and connected to the heater lead members 8, 8 of the detecting element A. The connection between the terminals 14 and lead members 8 is effected by a method, such as sintering with silver, which assures satisfactory conduction of current, resistance to heat and toughness.

In the same manner, terminals 15, 16, 17 fixedly extending through the insulating base 18 are connected to the lead members 11, 13 of the gas detecting semiconductor 2 and the temperature compensating semiconductor 3 of the gas detecting element A and to the common lead member 12 of both the semiconductors 2 and 3 by sintering with silver and the subsequent spot welding. Alternatively, the connection of the lead members may be provided by some other method which assures good conduction of current, heat resistance and toughness. Detachably fixed to the insulating base 18 is an explosion-proof cylinder 19 made of a 100- to 50-mesh reticulate material for covering the gas detecting element A without blocking the passage of the gas vapor to be detected and for preventing sparks from flying from the interior to the outside, the lower end of the cylinder 19 being secured to the base by screws 20, with the detecting element A housed in the cylinder 19. The open upper end of the reticulate cylinder 19 is covered with a top plate 21.

As already described, the gas detecting element A of this invention detects the presence of the gas vapor to be detected and the concentration thereof from the ratio $R_g/R_s$ between the resistance value $R_g$ of the gas detecting semiconductor 2 and the resistance value $R_s$ of the temperature compensating semiconductor 2. The gas detecting assembly B including the gas detecting element A is incorporated into an equivalent circuit as shown in FIG. 4 to provide a meter for measuring the concentration of insanitary gas vapor or a device for recording the concentration of insanitary gas equipped with alarm means as will be described below.

The gas detecting semiconductor 2 ($R_g$) and the temperature compensating semiconductor 3 ($R_s$) of the gas detecting element A are connected to an auxiliary variable resistor $R_a$ and an auxiliary resistor $R_b$ respectively to provide a bridge circuit, whose opposite ends $P_2$ and $P_4$ are connected to a power source 22. A potentiometer L is connected to the neutral points $P_3$ and $P_1$ of the bridge circuit, and the heater 7 of the gas detecting element A is connected to the power source 22.

The resistance value of the auxiliary variable resistor $R_a$ is set at such level that when the ratio $R_g/R_s$ between the resistance value $R_g$ of the gas detecting semiconductor 2 and the resistance value $R_s$ of the temperature compensating semiconductor 3 is constant, namely when the gas vapor to be detected is not detected in the atmosphere, the potential difference between the neutral points $P_1$ and $P_3$ is zero.

In this state, the contact of the gas detecting semiconductor 2 of the gas detecting element A with a gas vapor to be detected varies the resistance value $R_g$ of the gas detecting semiconductor 2 but exerts no influence on the resistance value $R_s$ of the temperature compensating semiconductor 3 which is sealed up against the contact with the atmosphere containing the gas to be detected. Accordingly, the ratio $R_g/R_s$ varies to bring the bridge circuit out of balance and thereby produce a potential difference between the neutral points $P_3$ and $P_1$ of the bridge circuit, which is indicated on the potentiometer L. The potential difference is dependent on the variation in the ratio $R_g/R_s$ between the resistance value $R_g$ of the gas detecting semiconductor 2 and the resistance value $R_s$ of the temperature compensating semiconductor 3. A concentration scale for the gas vapor to be detected, if provided on the potentiometer L, enables the pointer of the potentiometer to indicate the concentration of the gas vapor.

Figure 5:
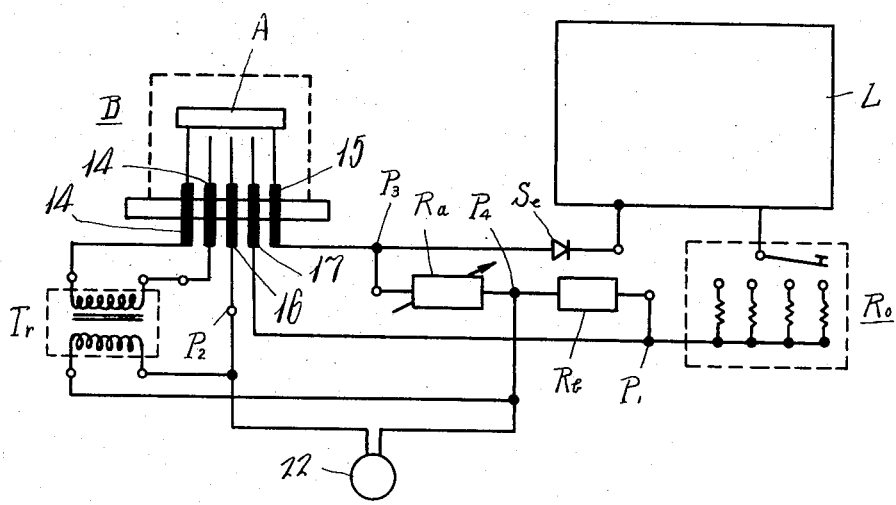
FIG. 5 is a diagram showing the circuit of a concentration meter for insanitary gas vapor.

A meter for measuring the concentration of insanitary gas vapor employing the gas detecting element A of this invention is shown in FIG. 5. Referring to this figure, the terminal 15 of a gas vapor detecting assembly B is connected to an auxiliary variable resistor $R_a$, the terminal 17 is connected to auxiliary resistor $R_b$, and an AC power source 22 is connected to the common terminal 16 of the detecting assembly and an intermediate portion between the auxiliary resistors $R_a$ and $R_b$, namely to the opposite ends $P_2$ and $P_4$, whereby a bridge circuit is formed. The neutral points $P_1$ $P_3$ of the bridge circuit are connected to the potentiometer L by way of a range changeable resistor $R_o$ and a selenium rectifier 24. The terminals 14 and 14 of the gas detecting assembly B are connected to the power source 22 through a ferro-resonance transformer TRANS. The whole unit thus put together is then housed in an unillustrated casing.

Each of the resistors incorporated into the concentration meter of this invention should have a resistance value selected in accordance with the principle of the electric circuit. For example, the auxiliary variable resistor $R_a$ may have a maximum resistance of 100K$\Omega$ and the auxiliary resistor $R_b$, a resistance of 50K$\Omega$. The range changeable resistor $R_o$ may be such as can be changed over in four steps over the range of 10K$\Omega$ to 1.6M$\Omega$. The potentiometer L may be a DC ammeter (potentiometer) have a maximum capacity of 50mA. Instead of using the scale of the ammeter, the potentiometer L should be provided with a scale, for example one calibrated in p.p.m., for indicating the concentration of the gas vapor to be detected so that the meter directly indicates the concentration of the gas vapor. The scale should be prepared based on the data obtained by actual researches and experiments.

Figure 12:
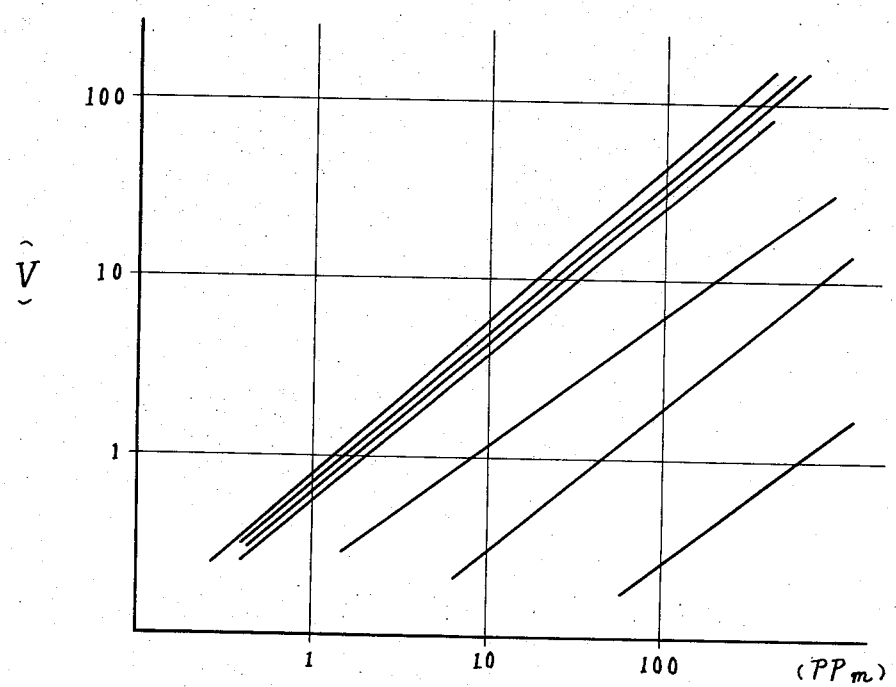
FIG. 12 is a graph showing the performance characteristics of the concentration meter for insanitary gas vapor in accordance with the present invention.

The graph of FIG. 12 shows the relationship between the concentration of the gas vapor and the indication of the potentiometer as determined based on the actual measurement by the concentration meter described above. The semiconductor used for the gas detecting element A for this experiment was of a composition consisting of $V_2O_5$, $Ag_2O$ and $ZnO$ in the weight ratio of 7.5 : 0.5 : 92. In this graph the indication on the potentiometer L is plotted as ordinate and the concentration of the gas to be detected as abscissa. The curves each represent the results obtained with respect to each gas used: a curve 39 for acetone, a curve 40 for methylchloroform, a curve 41 for methyl alcohol, a curve 42 for styrene monomer, a curve 43 for ethyl alcohol, a curve 44 for toluol, and a curve 45 for a liquefied petroleum gas.

Figure 6:
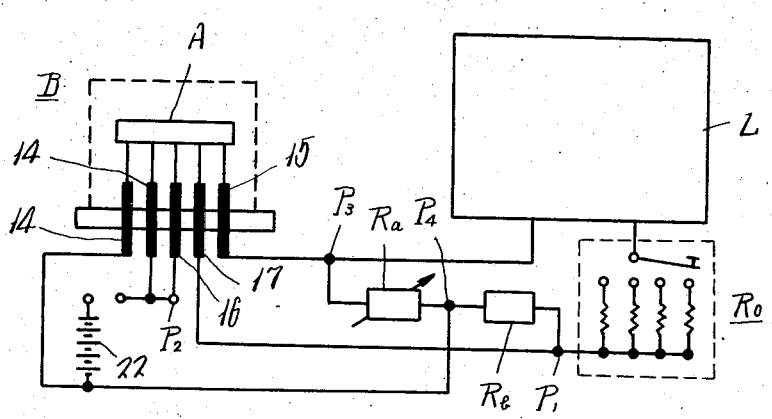
FIG. 6 is a diagram showing the circuit of a concentration meter for insanitary gas vapor of the portable type.

FIG. 6 shows a meter for measuring the concentration of insanitary gas vapor of the portable type in which direct current (i.e. battery) is employed for the power source 22. In this concentration meter, the terminals 15, 16, 17 of a detecting assembly B for insanitary gas vapor are connected to an auxiliary variable resistor $R_a$ and an auxiliary resistor $R_b$ to provide a bridge circuit. The neutral points $P_1$ and $P_3$ are connected to a potentiometer L by may of a range changeover resistor $R_o$. The terminals 14 and 14 of the detecting assembly B are connected to the power source 22. The whole unit thus constructed may be housed in an unillustrated portable casing.

The resistance values of respective resistors incorporated in this concentration meter of the portable type may be determined suitably. For example, the auxiliary resistor $R_a$ may be a variable resistor having a maximum resistance of 10K$\Omega$ and the auxiliary resistor $R_b$ may have a resistance of 30K$\Omega$. The range changeable resistor may be such that the resistance can be changed in four steps over the range of 10$\Omega$ to 990K$\Omega$.

Figure 7:
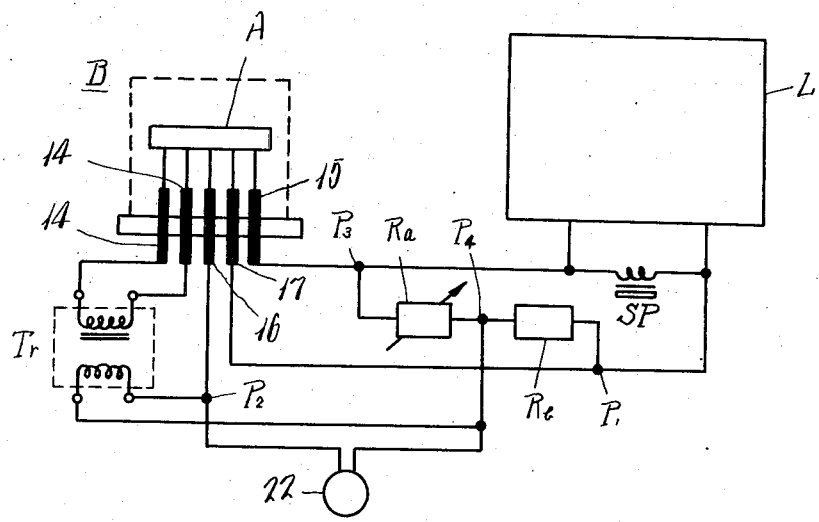
FIG. 7 is a diagram showing the circuit of a device for recording the concentration of insanitary gas vapor equipped with alarm means.

FIG. 7 shows a device for recording the concentration of insanitary gas vapor equipped with alarm means. The terminals 15, 16, 17 of a detector assembly B for detecting insanitary gas vapor are connected to an auxiliary variable resistor $R_a$ and an auxiliary resistor $R_b$ to form a bridge circuit. A potentiometer L and alarm means 23 are connected in parallel with the neutral points $P_1$ and $P_3$ of the bridge circuit, with the opposite ends $P_2$ and $P_4$ of the bridge circuit connected to a power source 22. The power source 22 is further connected to the terminals 14, 14 of the detecting assembly B by way of a ferro-resonance transformer TRANS.

When necessary, the potentiometer L may further be provided with a range changeable resistor $R_o$. In parallel with the potentiometer L, or in place of the potentiometer L, an automatic recorder is connected. The recording device of this invention may be adapted for use with both AC and DC power sources, with suitable current changeover means incorporated therein.

The advantages and effects to be achieved by this invention will be described below. Since, with the present element for detecting insanitary gas vapor, the presence and concentration of a gas vapor to be detected are determined on the basis of the ratio of resistance value between the gas detecting semiconductor and the temperature compensating semiconductor which are heated to an approximately constant temperature, errors in measurement will be completely avoided which would otherwise be produced due to changes in environmental conditions such as increase or decrease in the environmental temperature, variation in the speed of wind or variation in the voltage of the power source for the heater. The detecting element per se, being very simple in construction, can be assembled together into a unit which is of the order of millimeters in size. Since the detecting assembly for insanitary gas vapor incorporating therein the present detecting element is covered with an explosion-proof reticulate cylinder, it is entirely free from the possible explosion induced by the heat of the detecting element. In addition, the meter for measuring the concentration of insanitary gas vapor according to this invention permits, with its range changeable means, accurate measurement even when the concentration of the gas vapor to be measured is very low, unlike with the devices heretofore known which required and amplifier. The device for recording the concentration of insanitary gas vapor equipped with alarm means provides a warning if the concentration of the gas vapor exceeds a predetermined level while recording the condition of an insanitary atmosphere all the time.

The present invention finds various applications as given below. With the use of the present devices, the conditions of an atmosphere containing insanitary gas vapor can be detected accurately, easily and promptly over a wide range irrespective of the environmental conditions. Accordingly, the present devices are very useful for: measurement and recording of the concentration of insanitary gas vapor in the atmosphere; warning of hazardous conditions; maintenance, control, warning and measurement of gas vapor concentration during manufacture, storage, transportation or handling of insanitary gas vapor; safety, maintenance, sanitation in various factories, buildings, underground streets; measurement and control of exhaust gas from versatile heat engines; etc. Thus the present invention is of extreme use for a wide variety of application.

What is claimed is:

1. An element for detecting insanitary gas vapor comprising a cylinder made of an alumina ceramic material and provided with a heater extending through the interior thereof, a gas detecting semiconductor and a temperature compensating semiconductor both made of the same metal oxides and fixedly provided by sintering around the outer peripheral surface of said cylinder in adjacent relation to each other, lead members connected to said semiconductors respectively, a common lead member connected to both of said semiconductors, and glass sealing members covering and hermetically sealing the opposite open ends of said cylinder and said temperature compensating semiconductor so as to produce variation in the ratio of resistance value between said gas detecting semiconductor exposed to the atmosphere and said hermetically sealed temperature compensating semiconductor.

2. An assembly for detecting insanitary gas vapor comprising said element for detecting insanitary gas vapor as set forth in claim 1, an insulating base, a row of terminals fixedly extending through said insulating base and connected to the lead members of the gas detecting semiconductor and the temperature compensating semiconductor of said detecting element and to the lead members of said heater respectively, and an explosion-proof reticulate cylinder detachably fixed to said base for covering said detecting element.

3. A meter for measuring the concentration of insanitary gas vapor comprising said assembly for detecting insanitary gas vapor as set forth in claim 2, an auxiliary variable resistor and an auxiliary resistor for forming a bridge circuit connected to the terminals of the gas detecting semiconductor and the temperature compensating semiconductor of said detecting assembly, a potentiometer connected to the neutral points of said bridge circuit by way of a range changeable resistor and provided with a scale for indicating the concentration of the gas vapor, and a power source connected across the input terminals of said bridge circuit and the terminals of said heater.

4. A device for recording the concentration of insanitary gas vapor equipped with alarm means comprising said meter for measuring the concentration of insanitary gas vapor as set forth in claim 3 and means for automatically recording potential difference and alarm means connected in parallel with said potentiometer.

5. The element for detecting insanitary gas vapor as set forth in claim 1 wherein said metal oxide semiconductors are made of vanadium pentoxide—$V_2O_5$, zinc oxide — $ZnO$ and silver oxide — $Ag_2O$.

6. The element for detecting insanitary gas vapor as set forth in claim 1 wherein said metal oxide semiconductors are made of vanadium pentoxide — $V_2O_5$, tin oxide — $SnO_2$ and silver oxide — $Ag_2O$.

7. The element for detecting insanitary gas vapor as set forth in claim 1 wherein said metal oxide semiconductors are made of zinc oxide — $ZnO$ and tin oxide — $SnO_2$.

8. The element for detecting insanitary gas vapor as set forth in claim 1 wherein said metal oxide semiconductors are made of zinc oxide — $ZnO$ and calcium oxide — $CaO$.

9. The element for detecting insanitary gas vapor as set forth in claim 1 wherein said metal oxide semiconductors are made of tine oxide — $SnO_2$ and calcium oxide — $CaO$.

10. The element for detecting insanitary gas vapor as set forth in claim 1 wherein said metal oxide semiconductors are made of vanadium pentoxide — $V_2O_5$, zinc oxide — $ZnO$ and silver oxide — $Ag_2O$ in the ratio of $10-5 : 95-87 : 0.5-3$ in percent by weight.

* * * * *